United States Patent [19]
Yashnov et al.

[11] Patent Number: 5,751,113
[45] Date of Patent: May 12, 1998

[54] CLOSED ELECTRON DRIFT HALL EFFECT PLASMA ACCELERATOR WITH ALL MAGNETIC SOURCES LOCATED TO THE REAR OF THE ANODE

[75] Inventors: Y. M. Yashnov; V. A. Petrosov; V. I. Baranov; A. L Vasin, all of Moscow, Russian Federation; L. Talaalout, Toulouse, France

[73] Assignee: Space Power, Inc., San Jose, Calif.

[21] Appl. No.: 760,952

[22] Filed: Dec. 9, 1996

[30] Foreign Application Priority Data

Apr. 1, 1996 [RU] Russian Federation ............ 96105557

[51] Int. Cl.$^6$ .................................................. H05H 1/00
[52] U.S. Cl. ........................... 315/111.21; 315/111.41; 313/359.1
[58] Field of Search .................. 315/111.11, 111.21, 315/111.31, 111.41, 111.51, 111.61, 111.71, 111.81, 111.91; 313/359.1, 360.1, 361.1, 362.1

[56] References Cited

U.S. PATENT DOCUMENTS

| 4,841,197 | 6/1989 | Takayama et al. | 315/111.81 |
| 4,862,032 | 8/1989 | Kaufman et al. | 313/359.1 |
| 5,359,258 | 10/1994 | Arkhipov et al. | 313/359.1 |
| 5,475,354 | 12/1995 | Valentian et al. | 335/296 |
| 5,581,155 | 12/1996 | Morozov et al. | 315/111.21 |

*Primary Examiner*—Robert Pascal
*Assistant Examiner*—David H. Vu
*Attorney, Agent, or Firm*—Fliesler, Dubb, Meyer & Lovejoy

[57] ABSTRACT

A Hall effect plasma accelerator comprises an annular accelerating channel having closed and open ends. A source of magnetic field is positioned behind the closed end of the channel and has an axis extending in the same direction as the axis of the channel. This makes it possible to provide a Hall effect accelerator with an optimum distribution of magnetic field inside the acceleration channel by means of a simpler and less heavy arrangement using a single source of magnetic field, such as a single coil or permanent magnet. In addition it makes possible a reduction in heating of the source of magnetic field.

7 Claims, 3 Drawing Sheets

CLOSED ELECTRON DRIFT HALL EFFECT PLASMA ACCELERATOR WITH ALL MAGNETIC SOURCES LOCATED TO THE REAR OF THE ANODE

FIELD OF INVENTION

This invention relates to a Hall effect plasma accelerator, sometimes known as a closed electron drift accelerator. The invention arose when considering the design of such accelerators for use as thrusters on satellites or other spacecraft. However, it is also applicable to accelerators intended for other uses, for example plasma etching and machining workpieces in a vacuum.

BACKGROUND OF INVENTION

A conventional Hall effect accelerator comprises an annular accelerating channel extending circumferentially around an axis of the accelerator and also extending in an axial direction from a closed end to an open end. An anode is located, usually at the closed end of the channel, and a cathode is positioned outside the channel close to its open end. Means is provided for introducing a propellant, for example xenon gas, into the channel and this is often done through passages formed in the anode itself or close to the anode. A magnetic system applies a magnetic field in the radial direction across the channel and this causes electrons emitted from the cathode to move circumferentially around the channel. Some but not all of the electrons emitted from the cathode pass into the channel and are attracted towards the anode. The radial magnetic field deflects the electrons in a circumferential direction so that they move in a spiral trajectory, accumulating energy as they gradually drift towards the anode. In a region close to the anode the electrons collide with atoms of the propellant, causing ionization. The resulting positively charged ions are accelerated by the electric field towards the open end of the channel, from which they are expelled at great velocity, thereby producing the desired thrust. Because the ions have a much greater mass than the electrons, they are not so readily influenced by the magnetic field and their direction of acceleration is therefore primarily axial rather than circumferential with respect to the channel as the ions leave the open end of the channel they are neutralized by those electrons from the cathode that do not pass into the channel.

In this specification the terms "upstream" and "downstream" will be used for convenience to describe directions with reference to the movement of ions in the channel.

Conventionally, the required radial magnetic field has been applied across the channel using an electromagnet having a yoke of magnetic material which defines poles on opposite sides of the channel, i.e. one radially inwardly with respect to the channel and the other radially outwardly with respect to the channel. An example is shown in European patent specification 0 463 408 which shows a magnetic yoke having a single cylindrical portion passing through the middle of the annular channel and carrying a single magnetizing coil; and a number of outer cylindrical members spaced around the outside of the accelerating channel and carrying their own outer coils. The inner and outer cylindrical members are bolted to a magnetic back plate so as to form a single magnetic yoke. Another similar arrangement is shown in European patent specification 0 541 309.

It is well known that it is important to achieve a well defined distribution of the magnetic field within the channel and various arrangements of coils and magnetic bodies have been proposed in the past for this purpose. For example, Russian Patent Specification 2022167 describes arrangements of up to sixteen coils and magnetic screens.

Such attempts to achieve the optimum distribution of magnetic field within the channel can conflict with the need to keep the weight and complexity of the accelerator to a minimum when it is designed for use as a satellite thruster. Also an important factor, recognized in Russian Patent Specification 2022167, that needs to be taken into consideration is that temperatures inside the channel are very high and the coils need to be isolated from such high temperatures to prevent damage.

SUMMARY OF INVENTION

According to a first aspect, this invention provides a Hall effect plasma accelerator comprising a substantially annular accelerating channel having closed and open ends and a source of magnetic field positioned behind the closed end of the channel and having an axis extending in the same direction as the axis of the channel.

According to a second aspect, this invention provides a Hall effect plasma accelerator comprising a substantially annular accelerating channel having closed and open ends and a source of magnetic field positioned behind the closed end of the channel and extending around the axis of the channel.

By using the invention it is possible to provide a Hall effect accelerator with an optimum distribution of magnetic field inside the acceleration channel by means of a simpler and less heavy arrangement using a single source of magnetic field, such as a single coil or permanent magnet. The simpler design which results is considered particularly suitable for relatively small accelerators and allows the source of magnetic field to be positioned away from the accelerating channel thereby reducing the heating effect in the coil resulting from heat transferred from the channel. The position of the source of magnetic field behind the accelerating channel can also provide improved cooling of the source of magnetic field in operation, thereby further reducing the chance of damage through excessive heat. In pais aligned with an outer wall of the accelerator offers considerable heat advantages.

The shape of the substantially annular accelerating channel is not limited to a circular cross-section but could have an elongated, polygonal or irregular form. The source of magnetic field (which might be a permanent magnet or an electromagnet depending upon the requirements) has an axis extending in the same direction as the axis of the channel, that is to say at least a component of the axis of the source of magnetic field extends in the direction of the axis of the channel. The axis of the source of magnetic field does not have to be parallel to the axis of the channel.

The accelerator preferably includes a first magnetic body, which defines magnetic poles radially inwardly and outwardly of the channel. This first magnetic body may substantially or partially enclose or merely be in proximity to the source of magnetic field, depending on the specific application. For example, a more open structure without the coil being substantially enclosed may be preferred where the cooling of the coil is critical.

The first magnetic body preferably includes two main inner and outer walls which may be generally cylindrical in form or of another suitable form as appropriate to the shape of the accelerating channel being used and which extend from respective poles close to the open end of the channel, respectively inside and outside of the channel, to positions behind the closed end of the channel. A linking part of the first magnetic body behind the closed end of the channel may enclose the space between those walls to a fuller or lesser extent depending on the requirements for the magnetic field and for the reduction of heat levels in the particular application. This linking part preferably defines, possibly in co-operation with the inner and/or outer, main wall (or an extension thereof) an annular space, co-axial with the axis of the channel. This annular space houses the source of magnetic field and in a preferred arrangement, its outer wall is defined by an upstream extension of the main outer wall so that the source of magnetic field is located as far as reasonably possible from the source of heat and so that the surface area available for radiation of heat is maximized. The actual shape of the linking part will depend on the form of magnetic source used and may comprise a single or a number of straight or curved sections.

A preferred feature of the invention is the inclusion of a second magnetic body magnetically separate from and enclosed within the first magnetic body. This second magnetic body is preferably in the shape of a circle of "U" shaped cross-section arranged so that its "U" shape encloses the closed end of the channel thereby acting as a screen to reduce the magnetic field in the region of the anode.

BRIEF DESCRIPTION OF DRAWINGS

Two embodiments of the invention will now be described by way of example with reference to the drawings in which.

BEST MODE FOR CARRYING OUT INVENTION

Figure 1:
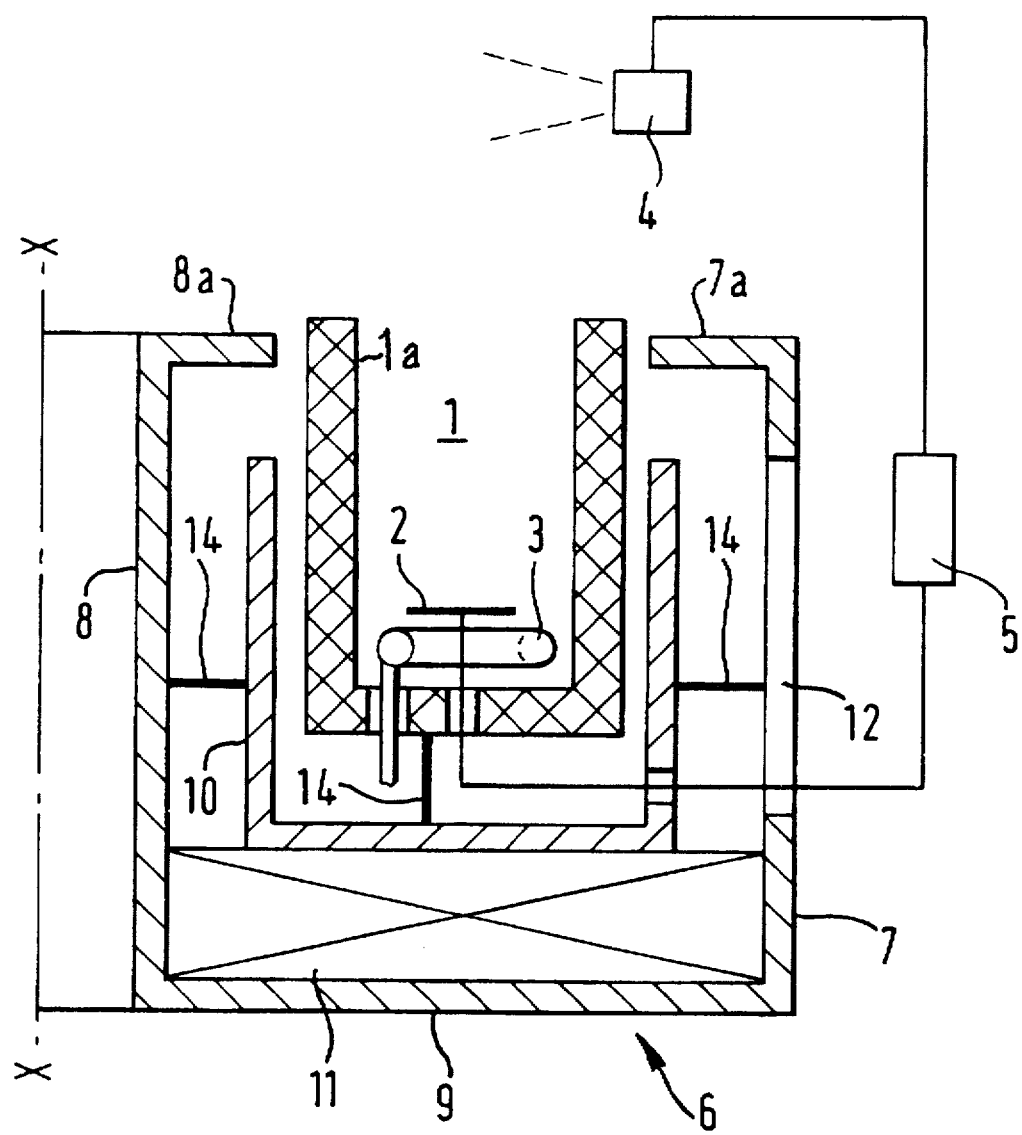
FIG. 1 shows an axial cross-section through a first embodiment of the invention, showing only one half of the cross-section, on one side of the axis, the other half on the other side of the axis being a mirror image.

Referring to FIG. 1 the accelerator is generally symmetrical about an axis X—X. It comprises an annular accelerating channel 1 defined by a ceramic insert 1a extending from a closed, upstream end (the lower end as shown in FIG. 1) to an open, downstream end. At the upstream end of the channel there is located a substantially circular anode 2 and a collector 3 which delivers propellant gas, typically xenon, to the channel in the vicinity of the anode 2. A cathode 4 is mounted outside the channel, close to the downstream end and is supplied with a negative potential by a power supply 5. A first hollow annular magnetic body 6 encloses all but the open, downstream end of the accelerating channel 1 and comprises a main outer cylindrical wall 7 radially external with respect to the annular channel. This wall 7 is associated with a radially inwardly extending pole-piece 7a. The magnetic body 6 also has a second main inner cylindrical wall 8 radially internal with respect to the channel and an associated radially outwardly extending pole-piece 8a. A linking part 9 joins the two walls 7 and 8 together at one end of the magnetic body 6 behind the closed end of the accelerating channel 1.

A second hollow annular magnetic body 10 is of U-shaped cross-section. It encloses the closed end of the channel 1 and is itself totally enclosed within the first magnetic body 6. A source of magnetic field 11, in the form of an electromagnet coil having its physical and magnetic axes coincident with the axis X—X, is situated behind (i.e. axially upstream of) the closed end of channel 1 and is enclosed by the first magnetic body 6. In an alternative construction the coil 11 could be replaced by an annular permanent magnet of equivalent magnetic effect. The second magnetic body 10 is supported by supports 14 to the first magnetic body 6. The supports 14 are made of non-magnetic material i.e. a material which does not influence the magnetic field or, expressed another way, having a relative permeability close to unity. This ensures that the supports do not distort the distribution of the magnetic field in the channel 1.

The pole-pieces 7a and 8a create an optimal magnetic field radially across a region close to the open end of the accelerating channel 1 while the second magnetic body 10 serves to reduce or eliminate any magnetic field in the region of the anode 2. Dissipation of heat from the channel is encouraged by slots 12 provided in first wall 7.

Figure 2:
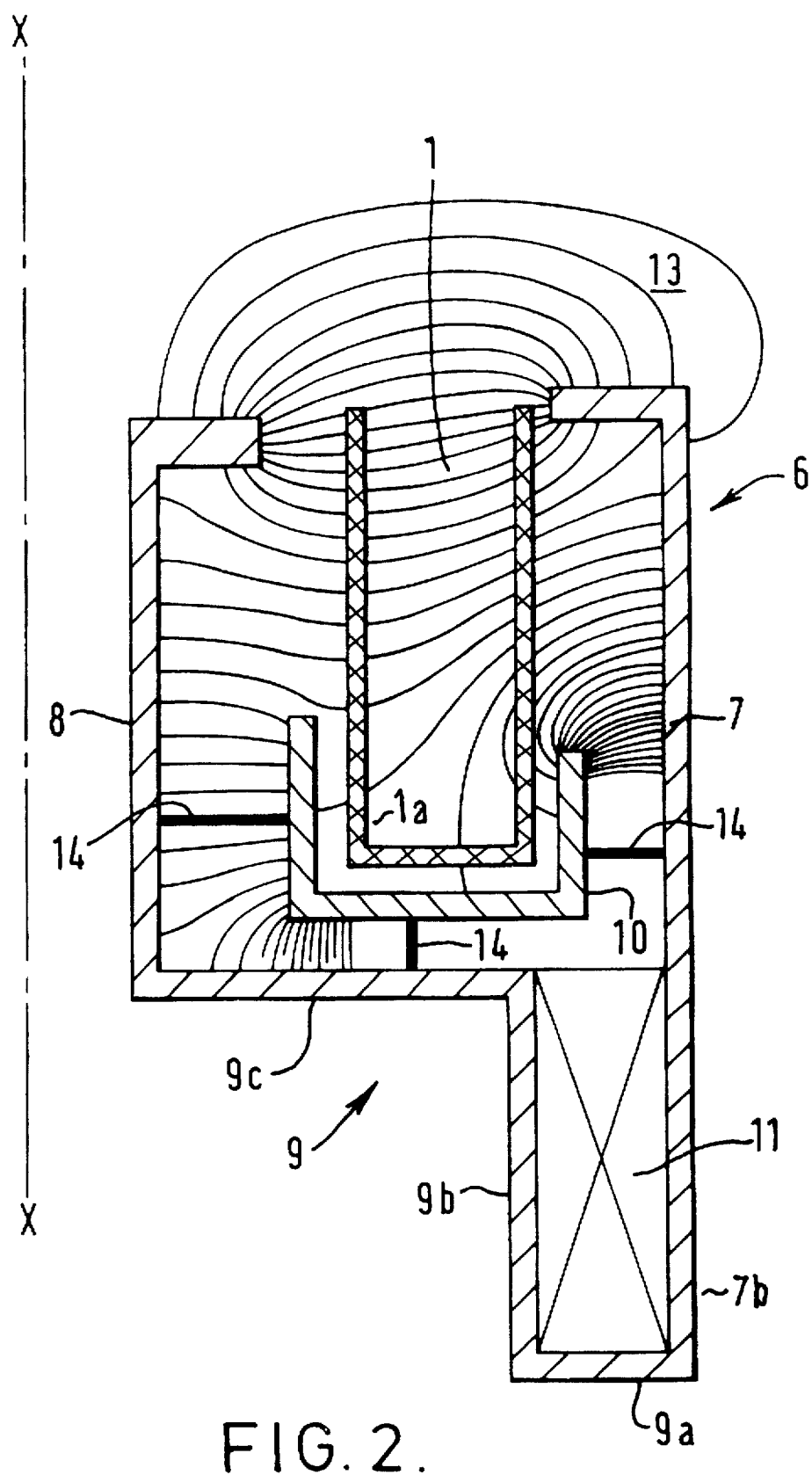
FIG. 2 shows in cross-sectional form equivalent to that of FIG. 1, a second, preferred embodiment of the invention and illustrates lines of magnetic field.
Figure 3:
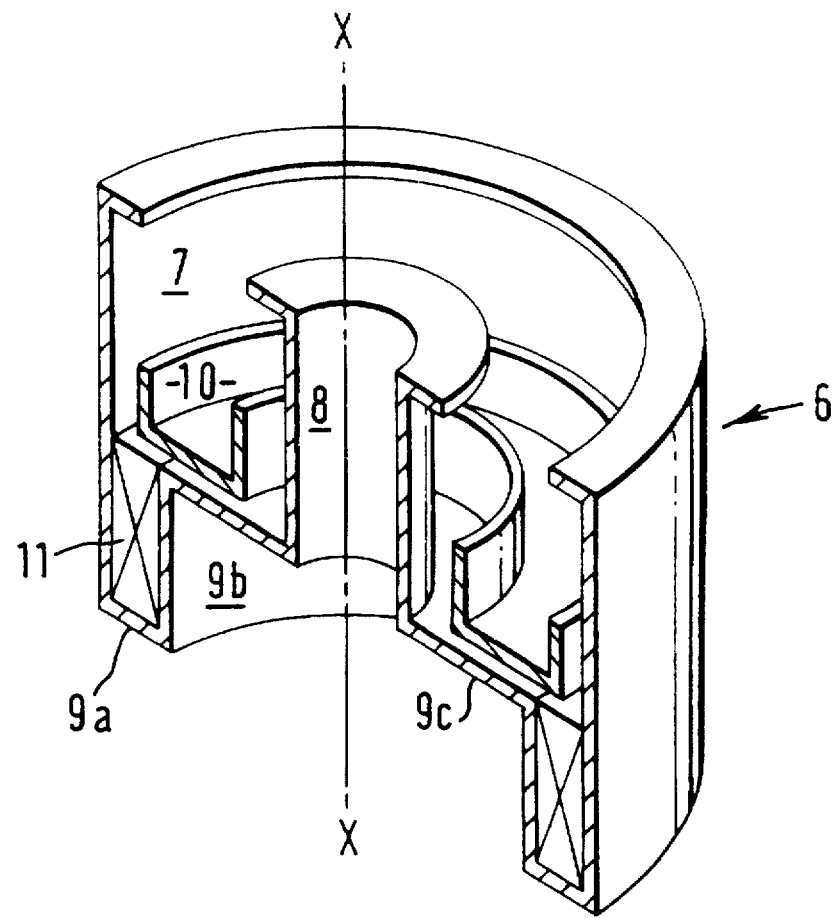
FIG. 3 shows the second embodiment in a perspective view cut in half though its axis and with its ceramic accelerating channel removed to reveal features of internal construction.

In FIGS. 2 and 3 similar features to FIG. 1 have been given the same reference numerals for clarity, however, some of the detail of FIG. 1 has been omitted for simplicity. FIGS. 2 and 3 show a second, preferred embodiment of the invention including, in FIG. 2, magnetic field lines 13. These lines 13 illustrate the radial nature of magnetic field created across the accelerating channel 1. In FIG. 2 the lines of magnetic field 13 have been omitted where they pass inside the magnetic bodies 6 and 10 and would be too close together to show clearly. It will be noted that in the embodiment of FIGS. 2 and 3 the coil is further away from the accelerating channel than its counterpart in FIG. 1. This reduces heating of the coil still further.

The outer wall 7 of the first magnetic body 6 has a part 7b extending behind the closed end of the channel 1. This is linked to the inner wall 8 by linking part 9 comprising sections 9a, 9b and 9c. Section 9a extends radially inward with respect to the axis of the annular channel 1 before meeting section 9b which extends axially downstream towards the closed end of the channel thus defining a cavity for the magnetic coil 11. The link between the outer and inner walls 7 and 8 is completed by section 9c of the linking part which extends from 9b to the end of the inner wall 8 situated behind the closed end of the channel 1. Because section 9b is substantially longer than 9a and because section 9c increases the diameter of the coil, its surface area is large, this assisting heat dissipation.

That which is claimed is:

1. A closed electron drift Hall effect plasma accelerator comprising:

a substantially annular accelerating channel having closed and open ends where the channel encircles a central vertical axis of the accelerator;

an anode within the channel and located at the closed end of the channel a first magnetic body spaced apart from the channel and enclosing the outside of the closed end of the channel to form a cavity between the bottom of the closed end of the channel and the first magnetic body and extending upwards on both sides of the channel towards the open end of the channel for defining magnetic poles of opposite polarity on opposite sides of the channel; and a source of magnetic field located within the cavity for creating a first magnetic circuit with the first magnetic body to form a magnetic field extending radially across the channel.

2. A closed electron drift Hall effect plasma accelerator comprising:

a substantially annular accelerating channel having closed and open ends where the channel encircles a central vertical axis of the accelerator;

an anode within the channel and located at the closed end of the channel;

a first magnetic body spaced apart from the channel and enclosing the outside of the closed end of the channel to form a cavity between the bottom of the closed end of the channel and the first magnetic body and extending upwards on both sides of the channel towards the open end of the channel for defining magnetic poles of opposite polarity on opposite sides of the channel;

a source of magnetic field located within the cavity for creating a first magnetic circuit with the first magnetic body to form a magnetic field extending radially across the channel; and a second magnetic body physically separated from and located between the channel and the first magnetic body and enclosing the outside of the closed end of the channel and extending upwards on both sides of the channel towards the open end of the channel to a point past the location of the anode within the channel for shielding the anode from the magnetic field generated by the source of magnetic field.

3. The accelerator of claims 1 or 2 wherein the source of magnetic field has a magnetic axis extending in the same direction as the central vertical axis of the accelerator.

4. The accelerator of claims 1 or 2 wherein the source of magnetic field has a magnetic axis extending around the central vertical axis of the accelerator.

5. The accelerator of claims 1 or 2 wherein the source of magnetic field comprises a single electromagnet.

6. The accelerator of claims 1 or 2 wherein the source of magnetic field comprises a single permanent magnet.

7. The accelerator of claims 1 or 2 wherein the first magnetic body comprises two cylindrical walls coaxial with the channel and arranged either side of the channel and a linking member linking the two cylindrical walls behind the closed end of the channel for forming the cavity behind the closed end of the channel for receiving the source of magnetic field.

* * * * *